UNITED STATES PATENT OFFICE.

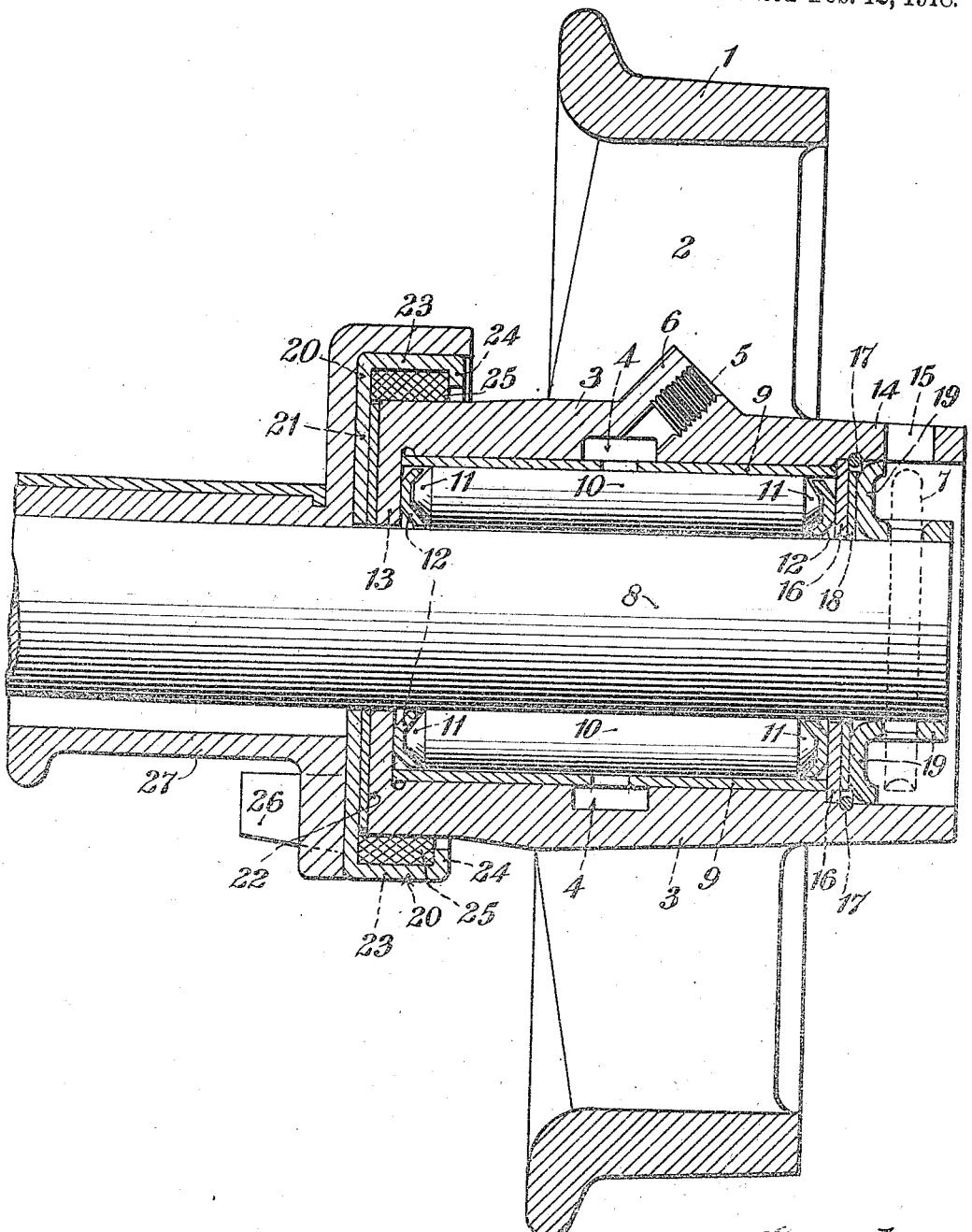

JOHN LEE McDOWELL, OF BERWICK, PENNSYLVANIA, ASSIGNOR TO AMERICAN CAR AND FOUNDRY COMPANY, OF NEW YORK, N. Y., A CORPORATION OF NEW JERSEY.

ROLLER-BEARING MINE-CAR WHEEL.

1,256,149.

Specification of Letters Patent.   Patented Feb. 12, 1918.

Application filed September 5, 1917. Serial No. 189,861.

*To all whom it may concern:*

Be it known that I, JOHN LEE McDOWELL, residing at Berwick, Columbia county, Pennsylvania, and being a citizen of the United States, have invented certain new and useful Improvements in Roller-Bearing Mine-Car Wheels, of which the following is a full, clear, and exact description, such as will enable others skilled in the art to which it appertains to make and to use the same, reference being had to the accompanying drawing, which illustrates the preferred form of the invention, though it is to be understood that the invention is not limited to the exact details of construction shown and described, as it is obvious that various modifications thereof within the scope of the claims will occur to persons skilled in the art.

In said drawing the single figure illustrates my improved car wheel in vertical section, showing its relation with its associated journal box.

This invention relates to improvements in roller bearing mine car wheels and consists in certain features of novelty as hereinafter more fully described and particularly pointed out in the claims.

Referring to the parts, 1 indicates the tread, 2 the spokes and 3 the hub of my improved wheel, which latter is provided with an annular lubricant chamber 4, access to which is obtained through the port 5 in the stud 6 which extends radially from the hub, which port 5 is internally screw-threaded, as shown, to permit temporary attachment thereto of a grease gun or other convenient means for forcing grease into the lubricant reservoir 4, after which the grease gun may be removed.

The wheel is what is known as the open end type of wheel in which the outer end is not closed by an integral lubricant-retaining wall, and the cotter pin 7, which secures the wheel to the axle 8, is at all times exposed to view.

Within the roller bearing chamber of the wheel is a sleeve 9 of suitable metal to serve as a wearing face for the rollers 10, which latter are of relatively maximum diameter throughout the major portion of their length and terminate in conical end portions 11, which are loosely mounted in the annuli 12, which latter may rotate freely independently of the wheel, if desired, though they are preferably held in position so as to rotate with the hub about the axle 8, while the rollers 10 rotate independently of the annuli 12 and the wheel hub. The sleeve 9 is perforated at convenient intervals to permit the passage of lubricant from the lubricant reservoir 4 to the rollers 10.

The inner end of the hub is closed, as shown, by the wall 13 formed integral with the hub 3 and the hub extends outwardly beyond the roller bearing assembly, as noted, to provide a dust cap 14 surrounding the outer end of the axle, which dust cap is perforated at 15 to permit insertion of the cotter pin 7. The sleeve 9 extends from the rear wall 13, with which it is preferably in contact, outwardly beyond the outer annulus 12 and preferably into contact with the washer 16 which retains the roller bearing assembly and the sleeve 9 in position within the wheel hub. Preferably the washer 16 is held in position by means of a split ring 17 which is seated in an annular groove outside of and immediately adjacent the washer 16, the ring 17 being of sufficient size and seated in a sufficiently deep groove to serve as a relatively permanent locking means to retain the washer 16 and the roller bearing assembly within the wheel hub, though the washer is split so that in case of an emergency the roller bearing assembly may be removed as, for example, when the tread 1 of the wheel is worn flat and it is desired to use the roller bearing assembly in a new wheel.

In approximate alinement with the ring 17 and next adjacent the washer 16, is a loose washer 18, and outside of this, that is nearer the outer end of the axle, is another washer 19 through which the cotter pin 7 passes so as to cause the washer 19 to rotate, if at all, only with the axle 8; that is, to permit the wheel to rotate independently of the washer 19, and the washer 18 is interposed between washers 16 and 19 to reduce the friction which might otherwise ensue.

Upon and inclosing the rear end of the hub is a lubricant-retaining cap 20 comprising the web 21 which provides a wear face or washer intermediate the rear face 22 of the wheel hub, or the next adjacent member of the assembly, and the journal box. This cap 20 may rotate with the wheel, if desired, and is provided with an outer flange 23, which extends longitudinally parallel with the axle 8, and an inturned flange 24 at right angles thereto, which, with the web 21, serves as retaining means to hold in position the packing 25 of hair felt or other suitable material to prevent loss of lubricant and incidentally to retain a film of lubricant between the rear face 22 of the wheel hub and the next adjacent face of the web 21, or between the faces of an interposed washer, when one is used, and the rear hub face 22 and said adjacent face of web 21.

If desired, the cap 20 may be provided with a lug 26 extending rearwardly therefrom, which lug is adapted to interlock with a convenient opening in an adjacent journal box 27 to prevent rotation of the cap.

In assembling the wheel after the hub has been properly bored, the sleeve 9 is inserted, then the elements of the roller bearing assembly, comprising the rollers 10 and annuli 12 are inserted, after which the washer 16 is inserted and the split ring 17 is placed in position to retain said washer 16 in relatively permanent position within the hub. The washer 18 is next applied, then the washer 19, and the cotter pin 7 is projected through the opening 15 in the cap 14, through the outstanding flange of washer 19 and the axle 8, and, due to the peculiar shape of the washer 19, a film of lubricant is retained between the inner face of said washer 19 and the next adjacent member of the wheel assembly, whether this member be the washer 18, or the washer 18 be omitted and the washer 19 contact with the washer 16.

What I claim is:

1. In a car wheel in combination, a wheel hub having an enlarged axle bore, a bushing therein, a washer and a removable ring adapted to hold said bushing in position, an axle, friction-reducing means intermediate the axle and bushing and an angular washer rigidly secured on the axle by means adapted to secure the wheel thereon.

2. In a car wheel, in combination, a wheel hub having a longitudinally extending bore of three diameters, an inner end wall, a bushing extending from near said wall outwardly, a washer of greater diameter than the internal diameter of said bushing and a split ring adapted to lock said bushing within said hub, an axle on which said wheel is mounted and a washer rigidly secured to said axle and rotatable therewith.

3. In a car wheel, in combination, a wheel hub having a longitudinally extending bore of three diameters, an inner end wall, a bushing extending from near said wall outwardly, a washer of greater diameter than the internal diameter of said bushing and a split ring adapted to lock said bushing within said hub, an axle on which said wheel is mounted, and a washer adapted to assist in positioning the wheel on said axle and to retard the flow of lubricant from said hub.

4. In combination in a car wheel, a hub, a tread and means connecting them, a perforated inner wall at one end and a dust cap at the opposite end all cast as an integer, there being an annular lubricant reservoir formed in said hub and a port intermediate the ends of the hub communicating with said reservoir, a sleeve in said hub partially closing said reservoir, a removable washer in the outer end of the hub, a removable ring engaging the hub and locking the sleeve in position, an angularly shaped washer secured to an axle on which said wheel is rotatably secured, and means for securing the washer to the axle.

5. In a car wheel in combination, a wheel hub having an inner end wall cast integral therewith and having an enlarged axle bore, a bushing therein, a washer and a removable ring adapted to hold said bushing in position, an axle, friction-reducing means intermediate the axle and bushing and an angular washer paralleling the axle for a part of its length and rigidly secured on the axle by means adapted to secure the wheel thereon.

6. In a car wheel, in combination, a cast wheel hub including an integral inner wall and having a longitudinally extending bore of a plurality of diameters, a bushing extending from near said end wall outwardly, a washer of greater diameter than the internal diameter of said bushing and a split ring adapted to lock said bushing within said hub, an axle on which said wheel is mounted and a washer rigidly secured on, paralleling said axle and rotatable therewith.

7. In a car wheel, in combination, a cast wheel hub with integral inner end wall and having a longitudinally extending bore of three diameters, a bushing extending from near said end wall outwardly, a washer of greater diameter than the internal diameter of said bushing and locking means adapted to secure said bushing within said hub, an axle on which said wheel is mounted, and a second washer rigidly secured to said axle having a flange surrounding the axle and adapted to assist in positioning the wheel on said axle and to retard the flow of lubricant from said hub.

8. In combination in a car wheel, a hub, a tread and means connecting them, a perforated inner wall at one end and a dust cap at the opposite end, all cast as an integer, there being an annular lubricant reservoir formed in said hub and a port intermediate the ends of the hub communicating with said reservoir, a sleeve in said hub partially closing said reservoir, a removable washer in the outer end of the hub, a removable ring engaging the hub and locking the sleeve in position, an angularly shaped washer secured to an axle on which said wheel is rotatably secured, means for securing the washer to the axle, and friction reducing means held in said hub by said removable washer.

In witness whereof I have hereunto set my hand in the presence of two witnesses.

JOHN LEE McDOWELL.

Witnesses:
 MARY E. BRUFF,
 THOS. B. HUYCK.